Nov. 30, 1971 G. SCHWERIN 3,623,321
HYDRAULIC REGULATING ARRANGEMENT
Filed Sept. 12, 1969 4 Sheets-Sheet 1

INVENTOR
Günther SCHWERIN
By his ATTORNEY

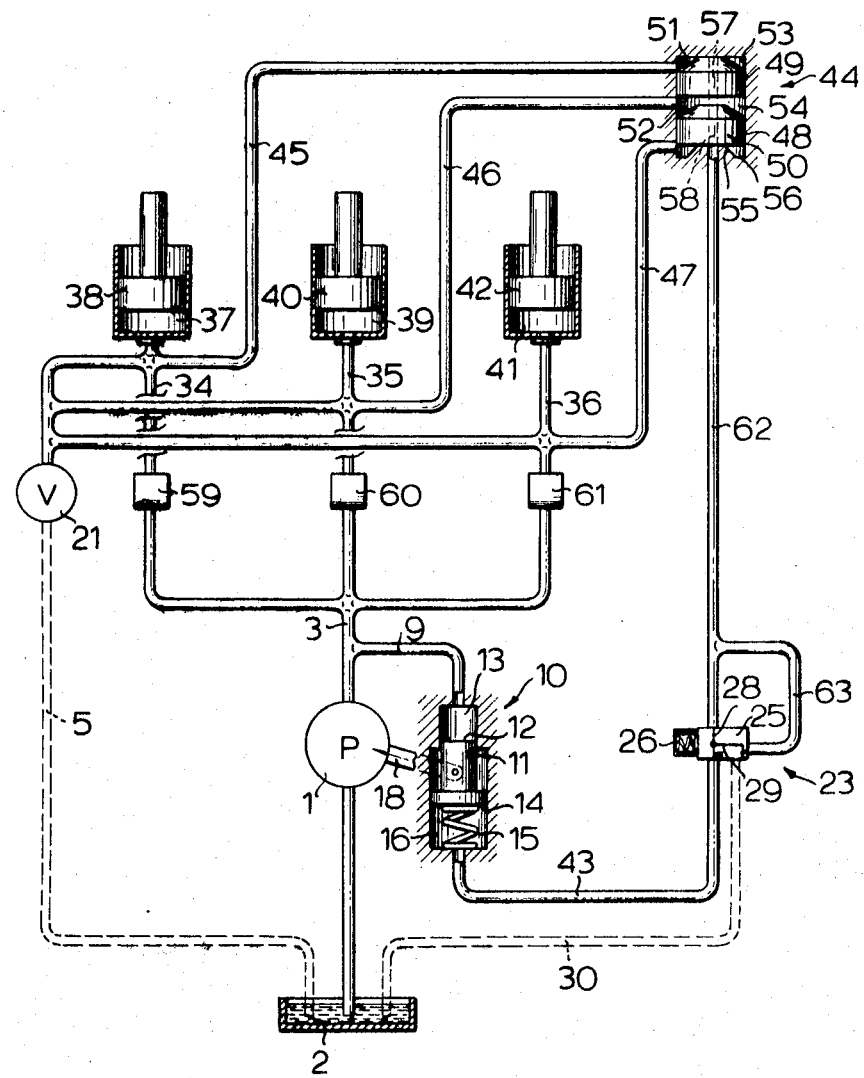

United States Patent Office 3,623,321
Patented Nov. 30, 1971

3,623,321
HYDRAULIC REGULATING ARRANGEMENT
Gunther Schwerin, Fellbach, Germany, assignor to
Robert Bosch, G.m.b.H., Stuttgart, Germany
Filed Sept. 12, 1969, Ser. No. 857,395
Claims priority, application Germany, Sept. 19, 1968,
P 17 28 270.1
Int. Cl. F15b 15/18
U.S. Cl. 60—52 VS                                8 Claims

ABSTRACT OF THE DISCLOSURE

A hydraulic arrangement in which a hydraulically-operated device is connected to a pump through a regulating valve. The pump delivers fluid under pressure and into a pressure line communicating with the regulating valve. A differential piston and cylinder has one face of the cylinder subjected to fluid pressure from the pump. The other side of the differential piston is subjected to the force of a spring and to the pressure prevailing between the regulating and the hydraulically-operated device. A pump adjustment member is mechanically coupled to the piston, so that the pump characteristics are adjusted as a function of the position of the differential piston. The differential piston assumes that position, in which the forces exerted upon the opposite sides of the piston are made equal.

BACKGROUND OF THE INVENTION

The present invention resides in a hydraulic regulating arrangement with a pump and a hydraulically-operated device which may be interconnected through a regulating valve. A positioning arrangement is provided between the pump and the regulating valve which influences the flow rate of the pump as a function of the pumped fluid pressure. The positioning arrangement possesses a spring which acts counter to the pumped fluid pressure.

Hydraulic arrangements are known in the art, which contain a pump, a hydraulically-operated device, and a regulating valve. In these arrangements, the pump operates with constant stroke, and the flow rate of the pump becomes limited to a maximum value through a pressure limiting valve connected to the pressure line. In such arrangements, therefore, the pump delivers continuously the same flow rate, and the fluid which is not required by the hydraulically-operated device, is returned to the storage tank. This is due to the condition that the regulating valve which is, for example, in the form of a flow rate limiting valve, allows only a predetermined set flow rate to reach the hydraulically-operated device. The corresponding control position for stopping the flow or transmitting the flow to and from the hydraulically-operated device, are set through an indicating valve which is also connected to the pressure line and connects the latter further with the hydraulically-operated device for the flow return line. In such arrangements, the pump must continuously deliver pressurized fluid, and as a result substantially large power losses and heating of the oil is incurred, and these features result in operating disadvantages.

Other hydraulic arrangements are known in which a settable pump is used that requires no pressure limiting and indicating valves. These known arrangements, have a positioning device for the settable or adjustable pump, which is connected only to the pressure line. The pressure within the pressure line are, in these arrangements, applied to a control element of the positioning device. The force of a spring acts upon the control element of this positioning device, in opposition to the applied pressure. The spring urges the control element to be located or held in a position in which the adjustable pump delivers the maximum flow rate. If, in this position of the control element, the regulating valve which is constructed, for example, in the form of a flow rate valve, does not require the maximum flow rate, then the pressure within the pressure line rises and is applied simultaneously to the control element of the positioning device. If the pressure applied to the control element, in this manner, exceeds or overcomes the spring force also applied to the control element, then the control valve is positioned against the force of the spring, and this results in a corresponding decrease of the pump flow rate. This action is carried out until the pump delivers only as much fluid as is reached at the hydraulically-operated device through the flow rate regulating valve. The fluid within the pressure line remains, thereby, still at the highest pressure, and this implies that the pressure difference to the hydraulically-operated results in considerable power losses. If, in place of the flow rate regulating valve, a pressure regulating valve is used, the positioning device positions the pump so that no flow rate takes place, when the desired pressure for the hydraulically-operated device is reached. When this latter condition is attained, the pressure regulating valve terminates the fluid flow rate. When the hydraulically-operated device operates below maximum velocity, moreover, power losses also appear. In these conventional arrangements, the pump is first set to the maximum flow rate or pump rate, and then becomes adjusted to smaller flow rates, in accordance with the requirements of the hydraulically-operated device. In such arrangements, undesirably large power losses or energy losses are incurred, when the flow rate is between zero and maximum flow.

Accordingly, it is an object of the present invention to provide a hydraulic regulating arrangement with the minimum amount of power losses. The regulating arrangement is also to be usable with many different applications as, for example, for pressure regulation in a hydraulically-actuated braking device, or for quantity or flow rate regulation in a hydraulically-operated feed device in a machine tool. Finally, pressure and flow rate are to be regulated in predetermined dependency of each other, as may be required, for example, in a lift-truck which is to lift small loads rapidly, and to lift heavy loads slowly. In this manner, the power capacity for the arrangement is utilized better than before.

The object of the present invention is achieved through the arrangement that the side of the positioning device opposite to the side subjected to the fluid pressure, is connected with side of the regulating valve leading to the hydraulically-operated device.

In an advantageous manner, the regulating valve is connected with the pump through a pressure line, whereas the regulating valve is connected with the hydraulically-operated device through an operating line. The regulating valve, furthermore, is constructed in the form of a pressure regulating valve.

It is also of advantage that the regulating valve is constructed in the form of a flow rate regulating valve, and that a pressure limiting valve is connected between the operating line and the positioning device. In one end position of this pressure limiting valve, the operating line is connected to the positioning device. In the other end position of this pressure limiting valve, on the other hand, the operating line is closed off, and the positioning device is connected to a flow return line. Another advantageous construction of the regulating valve resides in a combined pressure and flow rate regulating valve design.

If a regulating arrangement is required for a central hydraulic station or installation, it is of advantage that at least one more regulating valve be connected to the pressure line and in parallel with the preceding regulating valve. A separate operating line leads from each of the regulating valves to a separately associated hydraulically-operated device. All of the operating lines are connected to a pressure transmission device, and the operating line with the maximum pressure communicate with the side of the positioning device which is opposite to the side subjected to the fluid pressure.

All of the regulating valves for the hydraulic regulating arrangement are advantageously constructed in the form of pressure regulating valves. In the hydraulic regulating arrangement, it is also desirable in a number of applications, that at least one of the regulating valves be constructed in the form of a flow rate regulating valve and/or pressure-flow rate regulating valve. A pressure limiting valve is, furthermore, connected between the pressure transmitting device and the side of the positioning device which is opposite to the side subjected to the fluid pressure. In one end position of the pressure limiting valve, the pressure transmitting device is connected to the positioning device, whereas in the other end position, the pressure transmitting device is cut off or closed off, and the side of the positioning device which is opposite to the side subjected to the fluid pressure is connected with a flow return line.

It has been found to be of advantage in hydraulic regulating arrangements, that they include a regulating pump provided with a pump positioning or pump adjustment lever to achieve a variable pump lift or stroke. The pump adjustment lever is influenced through a piston of the positioning device. The piston is held in the position in which the pressure acting on the piston face from the pressure line, is equal to the force exerted by the spring and the hydraulically-operated device on the other side or face of the piston. It is also desirable in such a regulating arrangement, that a piston pump with constant stroke and a stroke regulator be used. The stroke or lift regulator is influenced by the piston of the positioning device. This piston of the positioning device is held in that position, in which the pressure from the pressure line acts upon one side of the piston and is equal to the force of the spring and that of the hydraulically-operated device on the other side of the piston.

For the purpose of influencing the positioning speed or velocity in an advantageous manner, the piston of the positioning device is designed in the form of a step piston, and/or the spring of the positioning device has a progressive characteristic. The progressive characteristic may be using for example a conical spring or a helical spring with variable pitch.

SUMMARY OF THE INVENTION

A hydraulic regulating arrangement in which a pump is used to deliver fluid under pressure from a storage tank. The pressurized fluid is used to operate a hydraulic device connected to the pump through a regulating valve. A differential piston or step piston with cylinder is connected between the regulating valve and the pump for the purpose of influencing the flow rate from the pump as a function of the flow pressure. The differential piston is connected by means of an adjusting lever to the pump for adjusting the flow characteristics thereof. The differential piston or step piston has one face or side which is subjected to the fluid pressure from the pump. The other side of the differential piston is acted upon by the force of a spring, which is directed in opposition to the fluid pressure from the pump on the other side of the piston. The side of the piston subjected to the spring force, communicates with the hydraulically-operated device and the regulating valve by being connected to the pressure line which joins the regulating valve to the hydraulically-operated device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a schematic diagram of a modification of the embodiment of FIG. 3, and includes a plurality of hydraulically-operated devices and associated flow rate regulating valves.

DESCRIPTION OF THE PREFERRED EMBODIMENTS

Figure 1:
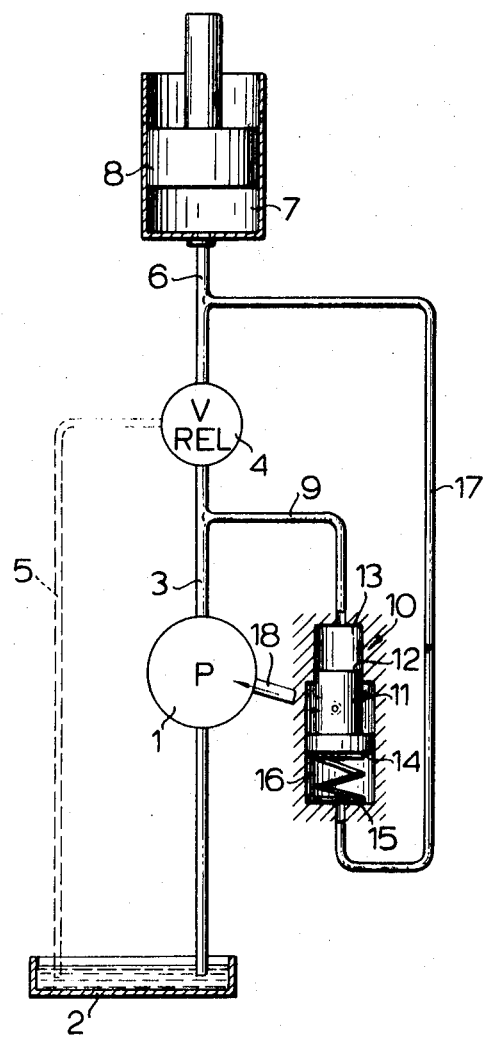
FIG. 1 is a schematic diagram of a hydraulic operating arrangement having a single hydraulically-operated device and one pressure regulating valve.

Referring to the drawing, and in particular to FIG. 1, the regulating arrangement shown therein has a pump 1 which pumps operating fluid from a storage tank 2 into a pressure line 3. A pressure regulating valve 4 is connected to the pressure line 3 and has, at the same time, a feedback line 5 to the storage tank 2. An operating line 6, furthermore, extends from the pressure regulating valve 4, and is connected to an hydraulically operated device which is in the form of a hydraulic cylinder 7 with a corresponding piston 8. A first control line 9 brancehs from the pressure line 3 and extends to a positioning arrangement 10. This positioning arrangement 10 has a positioning piston 11 which confines or borders a space 13 through the frontal side 12 of the positioning piston 11. The control line 9 opens into the space 13. A spring 15, which preferably has a progressive characteristic, abuts the other extreme side 14 of the positioning piston 11. This face or side 14 borders or restricts a space 16 into which a second branch from the operating line 6, in the form of the control line 17, opens or communicates. A pump setting lever 18 of the pump 1 is pivotally connected on the piston 11.

When in the position shown in the drawing, the pump setting lever 18 is in its zero or null position, in which the pump 1 does not deliver any pressurized fluid. The design of the positioning arrangement 10 is, however, such that the spring 15 tends to move the piston 11 into the space 13, whereby the pump setting lever 18 pivoted on the piston 11, becomes rotated in a counterclockwise direction. With such rotation of the lever 18, the pump 1 becomes set so that it delivers a larger amount of fluid. When the pump 1 delivers pressurized fluid into the pressure line 3, the pressurized fluid becomes transmitted further through the pressure regulating valve 4 and into the operating line 6 and the hydraulic cylinder 7. At the same time, pressurized fluid is transmitted to both sides 12 and 14 of the piston head 11, through the two control ilnes 9 and 17. As long as pressurized fluid passes through the pressure regulating valve 4, the same pressure prevails within the pressure line 3, the operating line 6, as well as the two control lines 9 and 17 with their connecting spaces 13 and 16.

As a result of the force exerted by the spring 15, however, the pressure applied to the face or side 14 of the piston 11 is increased. The piston 11 together with the connecting pump setting lever 18 are, thereby, pushed into a position, in which the pump 1 delivers fluid under pressure into the pressure line 3. When the pressure within the hydraulic cylinder 7 attains the value set on the pressure regulating valve 4, the operating line 6 is cut off or blocked from the pressure line 3. In view of the fluid is further delivered by the pump 1, the pressure within the pressure line 3 rises or increases rapidly and is communicated to the first control line 9 connecting with the pressure line 3, as well as the space 13 of the positioning arrangement 10. The higher pressure or force acting on the side 12 of the piston, thereby move the piston head 11 out of the space 13 and against the pressure forces applied to the side 14 within the space 16. With the movement of the positioning piston 11, the pump setting lever 18 is rotated in clockwise direction to its zero or null position, so that the pump 1 no longer delivers any fluid.

For the purpose of bringing the pump 1 to zero output condition, only a short-time flow of fluid is required into the line 3, after the operating pressure within the hydraulically-operated device 7, 8 has been achieved. In contrast with conventional arrangements, the power loss incurred is, thereby, substantially small. In the event that pressure impulses appear within the hydraulic cylinder 7, the pressure regulating valve 4 which serves as a safety valve, connects the feedback line 5 with the operating line 6, and the overflow of the pressurized fluid can, thereby, flow off from the hydraulic cylinder 7. If the pressure within the hydraulic cylinder 7 drops below that set on the pressure regulating valve 4, then the pressure line 3 becomes again connected to the operating line 6, through the pressure regulating valve 4. As a result, the pressure difference between the two control lines 9 and 17 and, therefore, the pressure difference acting on the piston head 11, become so small that the spring 15 moves the piston 11 into the space 13. The pump setting lever 18 is, consequently, again rotated in counterclockwise direction, and the pump 1 thereby delivers fluid again into the hydraulic cylinder 7, until the pressure within this cylinder reaches the value determined by the pressure regulating valve 4. When this pressure within the cylinder 7 has been attained, the pump 1 arrives at its zero output condition in the manner described above.

Figure 2:
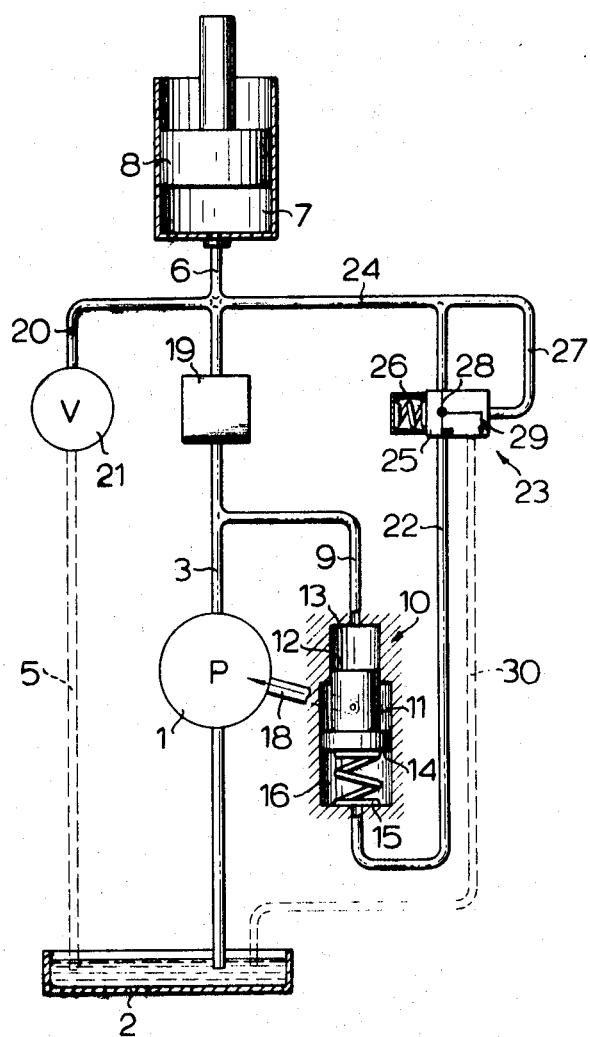
FIG. 2 is a schematic diagram of another embodiment of FIG. 1, in which one flow rate regulating valve and one hydraulically-operated device is used.

The embodiment of FIG. 2 shows a hydrauic regulating arrangement with a flow regulating valve. The elements in FIG. 2 which are identical to corresponding elements in FIG. 1, have been designated with the same reference numerals.

In this embodiment of FIG. 2, the pump 1 is again connected to a storage tank 2. The pressure line 3 leads to a flow rate regulating valve 19 from which the operating line 6 extends. The flow rate regulating valve can be, in its simplest form, an adjustable orifice or a throttling device. Connected to the operating line 6, are the hydraulic operating devices 7, 8, and the branch line 20 leading to a sink or drain valve 21 which communicates with the feedback line 5. The first control line 9 branches from the pressure line 3 and leads into the positioning arrangement 10. The latter has, similar to the construction of FIG. 1, a piston head 11 with a face or side 12 bordering the space 13, into which the first control line opens or enters. The spring 15 abuts the other face 14 of the piston head 11. The spring lies within the space 16 bordered by the face 14 of the piston. The second control line 22 opens into this space 16. The pump setting lever 18 is rotatably or pivotally mounted on the piston head 11. The second control line 22 leads to a pressure limiting valve 23 which is connected to the operating line 6, through a third control line 24. The pressure limiting valve 23 has a control element 25 which is abutted at one end thereof, by a spring 26. A fourth control line 27 branching from the third control line 24 is applied to the other end of the control element 25. The latter 25 has a duct or channel 28 through which control lines 22 and 24 are interconnected or connected to each other, when the spring 26 maintains the control element 25 in its right-most position, as shown in the drawing. The control element 25 has, furthermore, a recess or cavity 29 through which the second control line 22 is connected only with the feedback or return flow line 30 when the control element 25 is subjected to pressure from the fourth control line 27 so that the element 25 is positioned or held in the other extreme or left-most position.

Similar to the embodiment of FIG. 1, the spring 15 tends to move the piston head 11 and therewith the pump setting lever 18, into the position in which the pump 1 delivers the maximum amount of fluid. Through the simple flow regulating valve 19, a predetermined amount of fluid passes from the pressure line 3 into the operating line 6. and from there into the hydraulic cylinder 7. When the flow rate or fluid from the pump 1 into the pressure line 3 is greater than the flow rate permitted by the flow regulating valve 19 into the operating line 6, a pressure difference prevails or is established between the front and rear of the flow regulating valve 19. This pressure difference also appears at the faces or sides 12 and 14 of the piston 11, since the control line 9 connects the space 13 with the pressure line 3 and the control line 22 connects the space 16 with the operating line 6, by way of the channel 28 and the control line 24. As a result of the pressure difference existing across the flow regulating valve 19, the piston 11 is moved, by the pressure prevailing within the space 13, towards the space 16. Thus, the pressure acting on the side 14 within the space 16 is less than the pressure acting on the face 12 of the piston bordering the space 13. With the movement of the piston from the space 13 and towards the space 16, the pump setting lever 18 is rotated in clockwise direction, and as a result the pump 1 delivers only as much fluid as is allowed to pass from the pressure line 3 into the operating line 6, by the flow regulating valve 19. The pressures acting on the piston 11 become thereby equalized, through the control line 9 on the one hand, and the control line 22, the channel 28 and the control line 24, on the other hand. In view of the condition that no pressure drop consequently exists across the piston head 11, the latter together with the pump setting lever 18 is maintained in the corresponding position. In this position, therefore, the pump 1 delivers only as much fluid as required by the hydraulically-operated device.

When the desired pressure within the hydraulically-operated device 7, 8 has been attained, the flow regulating valve is, for example, closed. A substantially small increase in pressure in the line 3, compared to the pressure within the operating line 6, is then sufficient to move the piston 11 with the pump setting lever 18 into the position in which the pump 1 no longer delivers any fluid.

If the pressure within the hydraulic cylinder 7 becomes too large or the hydraulically-operated device 7, 8 becomes blocked, the pressure rises within the connecting operating line 6 and thereby in a further connecting control lines 24 and 27. When the pressure within these control lines 24 and 27 exceeds a predetermined level, the control element 25 is moved into its left-most position against the action of the spring 26, as a result of the pressure applied through the control line 27. In this position of the control element 25, the channel 28 and the control line 24 is separated from the control line 22. For this purpose, the control line 22 is connected with the flow return line 30 through the cavity or recess 29 of the control element 25. In this manner, the space 16 is free from fluid pressure, and the force of the spring 15 only acts upon the face or side 14 of the piston 11. In view of the pressure prevailing within the space 13, the piston 11 is moved out of the space 13 and thereby rotates the pump setting lever 18 into its null position, in which the flow rate of the pump 1 is zero. In the event that the pump 1 already did not deliver any fluid, then the flow rate becomes retained at this zero value. When the pressure within the branch line 20 connected to the line 24 exceeds a predetermined value, the drain valve 21 is also opened. In this position the branch line 20 is connected to the flow return line 5 and fluid from the hydraulic cylinder 7 flows off through the operating line 6, the branch line 20, and the sink or drain valve 21 which is constructed in the form of a safety valve in the conventional manner and is therefore not further described, then this overflow fluid from the cylinder 7 passes into the flow return line 5. As a result, the pressure within the cylinder 7, the operating line 6, and the control lines 24 and 27 drops quickly again below the level which is required for moving the control element 25 of the pressure limiting valve 23 against the force of the spring 26. The spring 26 thereby presses again the control element 25 towards its rightmost position in which the return flow line 30 is closed off or cut off and the control line 22 is again connected with the control line 24 through the channel 28. Just before the control element 25 of the pressure limiting valve is moved back to its right-most position. The drain valve 21 has closed and separated the branch line 20 from the flow return line 5. In this manner, the pressure difference across the flow regulating valve 19 can effect the required setting of the pumped flow rate, through the positioning of the piston 11.

The flow rate regulating valve can also be constructed as a combined pressure and flow rate regulating valve, when this becomes advantageous from the viewpoint of the hydraulic operated device, and such a resulting combined regulating valve may be installed within the arrangement of FIG. 2. The functional operation of such a combined valve is essentially the same as that described above in conjunction with the second embodiment.

Figure 3:
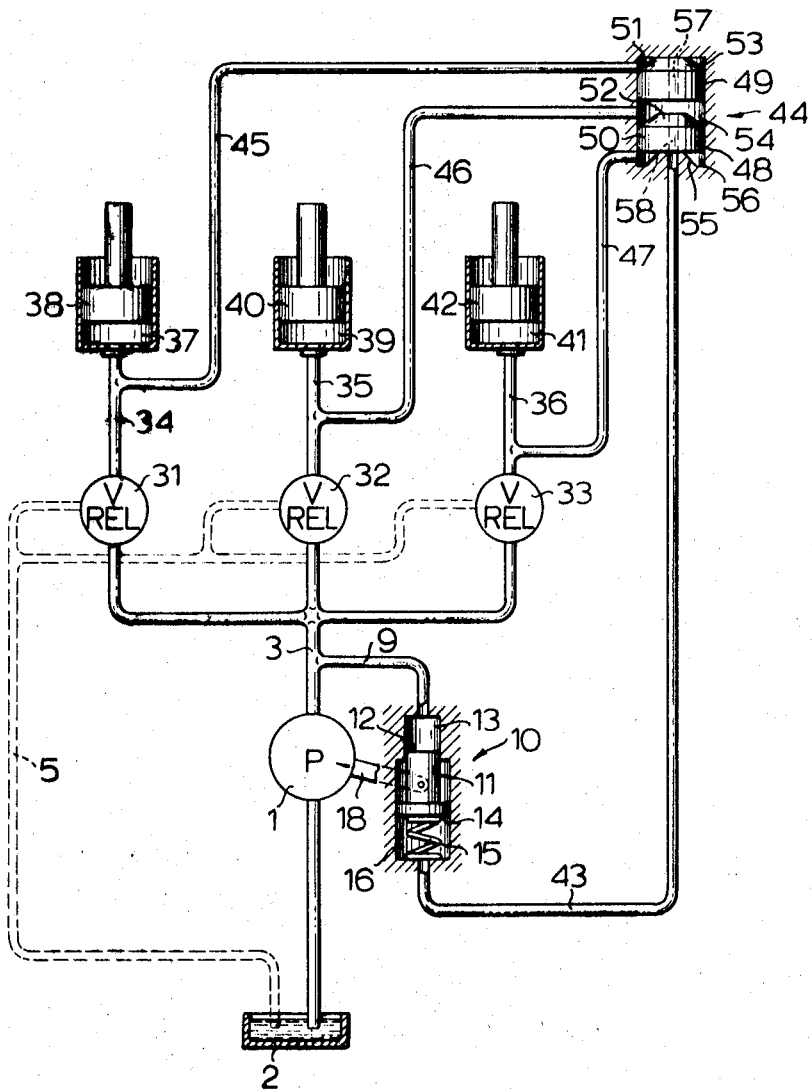
FIG. 3 is a schematic diagram of another embodiment of the arrangement of FIG. 1 with the inclusion of a plurality of hydraulically-operated devices and associated pressure regulating valves.

The embodiment shown in FIG. 3 provides a hydraulic regulating arrangement, in accordance with FIG. 1, but includes, however, three hydraulic-operated devices. Those elements in FIG. 3 which are the same as corresponding elements in FIG. 1, have been assigned identical reference numerals.

The pump 1 is connected to the storage tank 2 as well as to the pressure line 3 which leads to three pressure regulating valves 31, 32 and 33, shown in FIG 3. Each of the pressure regulating valves 31, 32 and 33 is connected to one hydraulically-operated device, through a corresponding operating line 34, 35, and 36, respectively. Each of these operating lines is, in turn, connected to one hydraulically-operated device which is constructed in the form of a hydraulic cylinder and piston combination 37–38, 39–40, 41–42. Each of the pressure regulating valves 31, 32 and 33, is connected with the flow return line 5. The first control line 9 leads again from the pressure line 3 to the positioning arrangement 10. The space 16 is connected to a pressure transmission arrangement 44, through a second control line 43.

A third control line 45, 46 and 47 extends from each of the operating lines 34, 35 and 36, respectively. These third control lines are connected to the pressure transmission arrangement 44. Within the space 48 of this pressure transmission device, are two piston heads 49 and 50 which are tightly guided against the walls of the space. The pistons possess conical-shaped portions 51 and 52 which form chambers 53 and 54 into which the control lines 45 and 46, respectively, enter. The face or side on the piston head 50 which lies opposite to the face having the conical-shaped portion 52, lies opposite the frontal side 55 of the space 48. This frontal side 55 is shaped so as to form a chamber 56 into which the control line 47 enters. Each of the piston heads 49 and 50 has a duct or channel 57 and 58, respectively, which passes through the central axis of the piston. The control line 43 terminates at the frontal face 55 of the space 48, along the same axis as the centrally located ducts 57 and 58.

Assume that different pressures prevail within the hydraulic cylinders 37, 39 and 41, as well as in their corresponding control lines 45, 46 and 47 which connect to the chambers 53, 54 and 56, respectively. If, for example, the pressure within the hydraulic cylinder 39 is now the greatest, the piston heads 49 and 50 will become moved apart and pressed against the frontal sides of the space 48, as a result of the pressure prevailing within the chamber 54. The chamber 54 is then connected with the control line 43, through the central duct 58. As a result, the highest pressure associated with the hydraulic device 39, 40 and prevailing within the chamber 54, is used to influence or affect the positioning arrangement 10 in the same manner as that described above in relation to the embodiment of FIG. 1. The chambers 53, 54 and 56 of the pressure transmission device 44 are separated from each other through the piston heads 49 and 50. The central ducts or channels 57 and 58 are, however, connected with the chamber 54 in which the highest pressure prevails These central ducts or channels are, at the same time, closed off from the chambers 53 and 56, because the frontal sides or faces of the pistons 49 and 50 lie tightly against the corresponding faces or sides of the space 48. Accordingly, with this arrangement using a plurality of hydraulic operated devices, the highest device pressure governs the positioning arrangement 10 by acting on the side or face 14 within the space 16 of this positioning arrangement. Furthermore, the pump setting lever 18 is rotated with the support of the spring 15 and against the effect of the pressure within the pressure line 3, so that the pump flow becomes varied to the extent that only as much fluid is pumped as that required to produce a pressure within the line 3 which is only slightly above the maximum device pressure. The resulting fluid flow is fully sufficient to supply the requirements of all hydraulically-operated devices. The power losses are thereby maintained as small as possible even in hydraulic regulating arrangement with a number or plurality of hydraulically-operated devices.

FIG. 4 shows a modification of the embodiment of FIG. 3. The elements of FIG. 4 which are also used in the embodiments of FIGS. 2 and 3, have identical reference numerals assigned to them. In place of the pressure regulating valves 31, 32 and 33, flow rate valves only or combined pressure and flow rate control valves are used.

If the regulating valves, in FIG. 4, are for example in the form of flow regulating valves 59, 60 and 61, then the pressure limiting valve 23 is still connected to the control line 43 which communicates with the space 16 of the positioning arrangement 10. In the position shown in FIG. 4, the control element 25 is in its right-most position, and thereby the duct or channel 28 connects the second control line 43 with the line 62 extending into the pressure transmission device 44. A fourth control line 63 branches from the connecting line 62, and this control line 63 leads to one end of the control element 25. The other end of this control element 25 abuts the spring 26.

Assume, now, that impulses or other phenomena in the hydraulic operated devices 37–38, 39–40, 41–42, cause a high pressure to prevail in the connecting line 62 and the control line 63 communicating therewith. If this pressure within the control line 63 is thereby so high that the control element 25 is moved against the force of the spring 26, into its left-most position, then the line 62 becomes closed off or disconnected from the second control line 43 At the same time, the second control line 43 becomes connected with the flow return line 30, through the cavity or recess 29 of the control element 25. The pressure impulses can, thereby, not influence the positioning arrangement 10 to increase the pressure fluid flow of the pump 1. Accordingly, the force of the spring 15 only still acts on the frontal side 14 of the piston 11, when the space 16 is connected with the flow return line 30, through the second control line 43 and the recess or cavity 29. In this manner, the pressure within the line 3 and in the connecting space 13 causes the piston head 11 with the pump setting lever 18 to be moved into the position in which no flow is realized from the pump 1.

It will be understood that each of the elements described above, or two or more together, may also find a useful application in other types of constructions differing from the types described above.

While the invention has been illustrated and described as embodied in a hydraulic regulating arrangement, it is not intended to be limited to the details shown, since various modifications and structural changes may be made without departing in any way from the spirit of the present invention.

What is claimed as new and desired to be protected by Letters Patent is set forth in the claims:

1. A hydraulic arrangement comprising, in combination, a pump for delivering fluid under pressure; a plurality of simultaneously operable and hydraulically operated devices for receiving the fluid delivered by said pump; regulating valve means connected to said pump by pressure line means and to said simultaneously operable and hydraulically operated devices pertaining thereto by operating lines; positioning means connected to said pressure line means for influencing the flow rate from said pump as a function of the pressure difference upstream and downstream of said regulating valve means; a member within said positioning means and having a first surface subjected to the pressure of the fluid delivered by said pump; spring means within said positioning means and exerting a force on a second surface of said member in a direction opposite to said pressure on said first surface; and a maximum pressure transmitting device connected to all of said simultaneously operable and hydraulically operated devices for permanently directing to said second surface of said member the fluid pressure of that device of said plurality of devices which contains the maximum fluid pressure independent of the fact whether none, one, several or all of said plurality of devices are in operation.

2. The hydraulic regulating arrangement as defined in claim 1 including pump adjusting means connected to said pump means for varying the pump stroke and connected to said member of said positioning means, said member being a piston in said positioning means and being held in a position wherein said fluid pressure on said first surface is equal to said force of said spring means on said second surface of said piston and the maximum pressure applied to a hydraulically-operated device.

3. The hydraulic regulating arrangement as defined in claim 1 including means for connecting said pump with said member of said positioning device, said pump being of constant stroke and said member being a piston within said positioning device, said piston being held in a position wherein said pressure on said first surface of said piston is equal to said force of said spring means and the maximum pressure of a hydraulically-operated device.

4. The hydraulic regulating arrangement as defined in claim 1 wherein said member within said positioning means comprises a stepped piston.

5. The hydraulic regulating arrangement as defined in claim 1 wherein said spring means comprises a conical spring with progressive characteristic.

6. The hydraulic regulating arrangement as defined in claim 1, wherein all regulating valve means comprise pressure regulating valves.

7. The hydraulic regulating arrangement as defined in claim 1, wherein said regulating valve means comprise at least one flow regulating valve; and including pressure limiting valve means connected between said pressure transmitting means and said positioning means, said pressure transmitting means being connected to said positioning means in one position of said pressure limiting valve means; and flow return means connected to said positioning means in a second position of said pressure limiting valve means, said pressure transmitting means being closed off from the positioning means when said pressure limiting valve means is in said second position.

8. The hydraulic regulating arrangement as defined in claim 1, wherein said regulating valve means comprise at least one pressure regulating valve; and including pressure limiting valve means connected between said pressure transmitting means and said positioning means, said pressure transmitting means being connected to said positioning means in one position of said pressure limiting valve means; and flow return means connected to said positioning means in a second position of said pressure limiting valve means, said pressure transmitting means being closed off from the positioning means when said pressure limiting valve means is in said second position.

References Cited
UNITED STATES PATENTS

| | | | |
|---|---|---|---|
| 2,238,061 | 4/1941 | Kendrick | 60—52 VSP X |
| 2,600,632 | 6/1952 | French | 60—52 VSP X |
| 2,921,439 | 1/1960 | Krafft et al. | 60—52 VSP |

EDGAR W. GEOGHEGAN, Primary Examiner

U.S. Cl. X.R.

60—97 P